United States Patent [19]
Patin

[11] 3,834,520
[45] Sept. 10, 1974

[54] VARIABLE SPEED DRIVE SYSTEM
[76] Inventor: Pierre Patin, 9 rue Nicolas Houel, 75005 Paris, France
[22] Filed: June 5, 1973
[21] Appl. No.: 367,120

[30] Foreign Application Priority Data
June 30, 1972 France.............................23811
Oct. 13, 1972 France.............................36260

[52] U.S. Cl.................................. 198/110, 104/25
[51] Int. Cl........................................... B65g 63/00
[58] Field of Search.......... 198/110, 16 MS; 104/25

[56] References Cited
UNITED STATES PATENTS
3,565,238   2/1971   Candela............................. 198/110

Primary Examiner—Richard A. Schacher
Assistant Examiner—Douglas D. Watts
Attorney, Agent, or Firm—Cameron, Kerkam, Sutton, Stowell & Stowell

[57] ABSTRACT

A variable speed drive for moveable elements guided along a trajectory has couplings connecting the elements in pairs. The couplings are formed of deformable polygonal loops having the same constant perimeter. The loops are mounted in tension between at least three linking points are carried respectively by two successive moveable elements and at least one linking point follows a cam arranged along the trajectory. The profile of the cam is such that the moveable element move toward and away from each other in the regions of deceleration and acceleration. Some of the linking points are formed by pivotable and/or slidable members to allow free formation of the polygonal loops.

19 Claims, 11 Drawing Figures

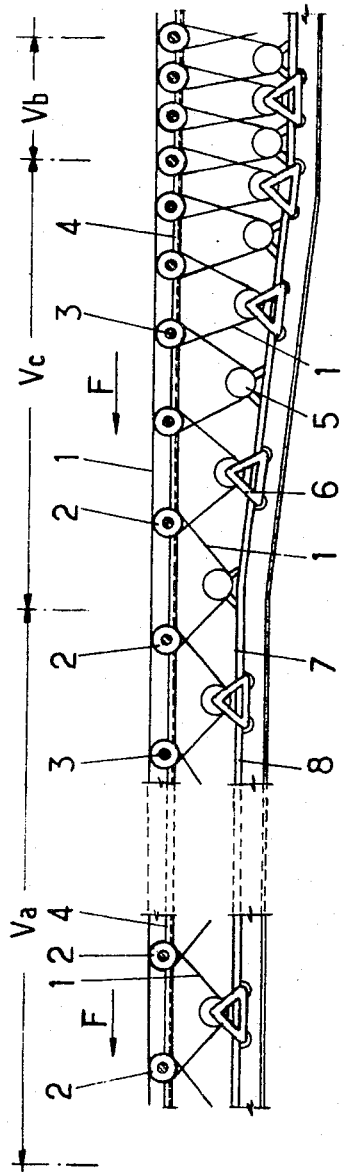
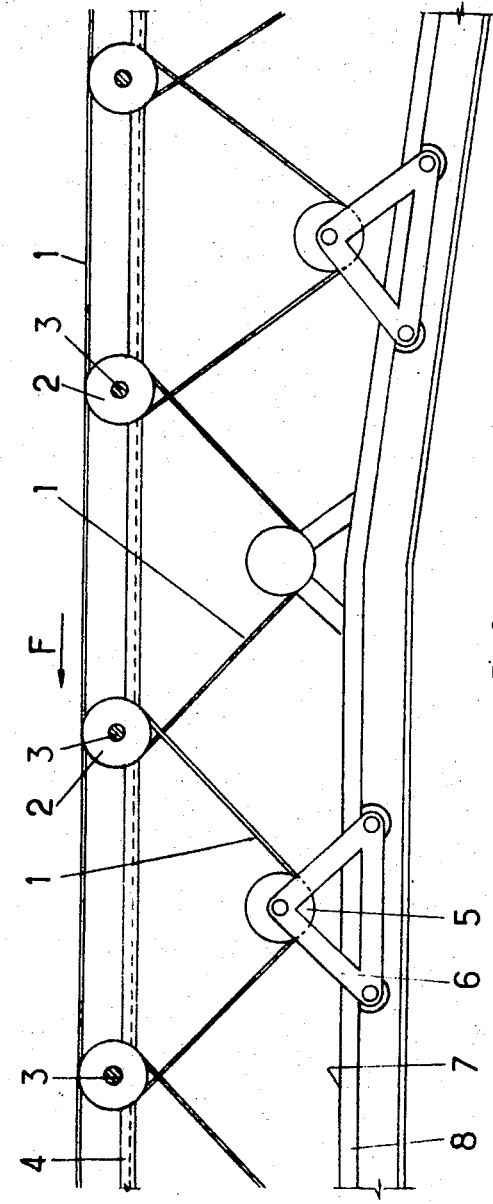
Fig.1
Fig.2

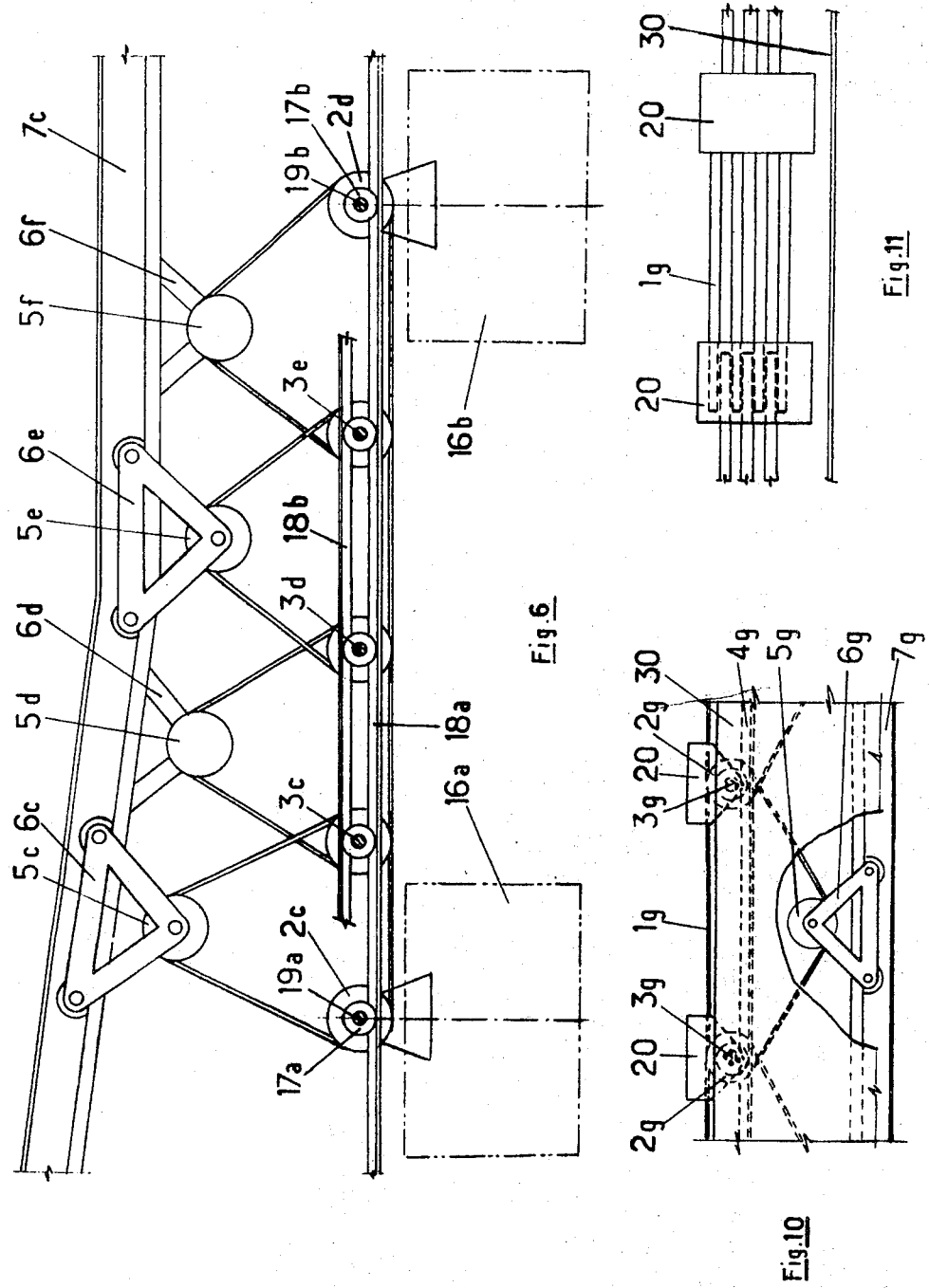

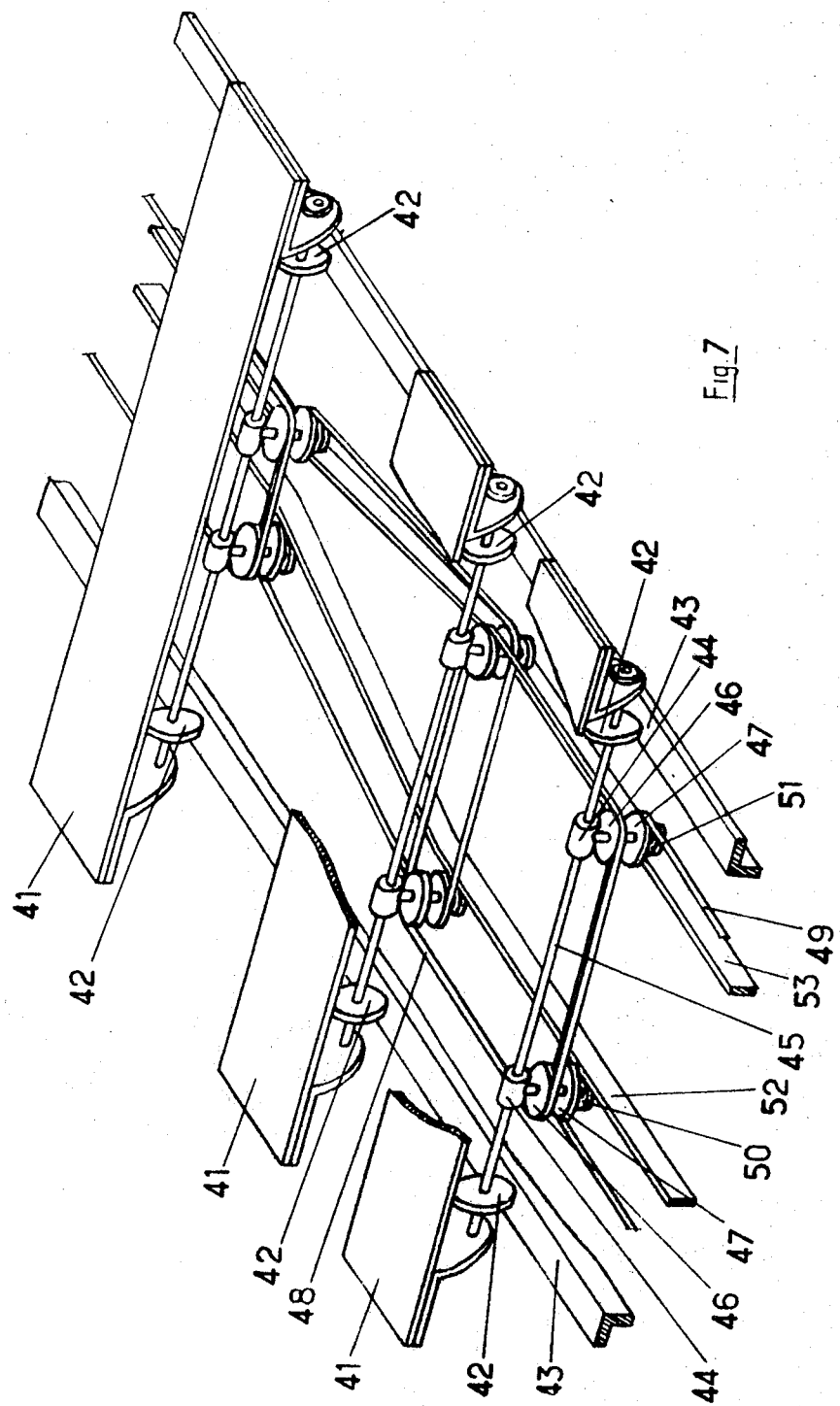

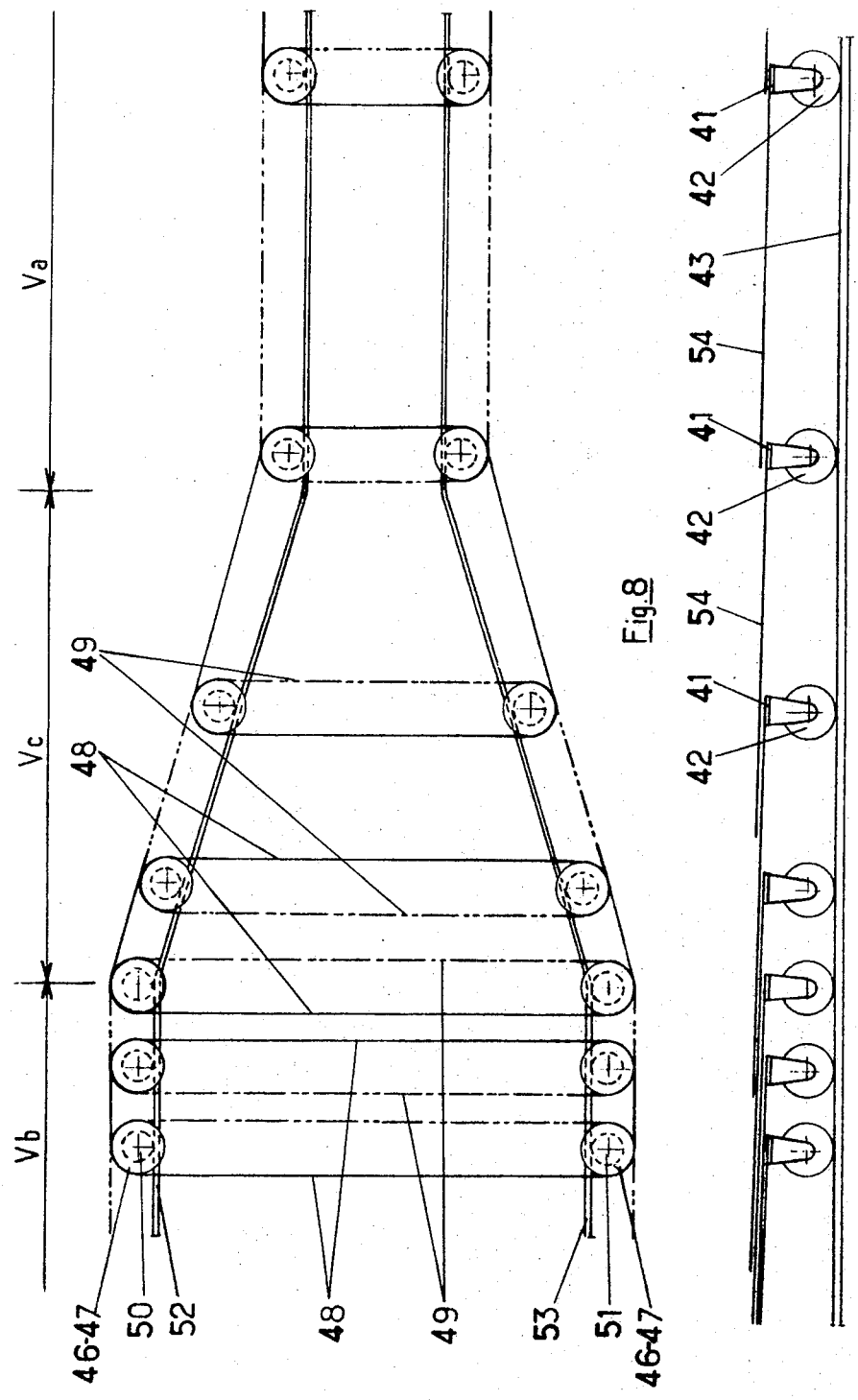

VARIABLE SPEED DRIVE SYSTEM

The invention relates to a variable speed drive system suitable for use with a continuous transport system.

A drive system for continuous means of transport having a variable speed has been proposed. In this system the variation of speed is obtained with the aid of successive rotating members driven at speeds of rotation which vary progressively from one member to the next. Such a system has a large number of mechanical members and requires transmission systems of very high accuracy, uses much power, and also is relatively expensive.

Another system has been proposed which employs an element capable of being expanded or contracted longitudinally so that this element moves at different linear speeds according to the length of the element. These expansions and contractions are obtained by the use of systems formed of rods articulated in pairs with one end connected to an element of the transporter and the other end is guided along a cam disposed at variable distance with respect to the trajectory of the elements. Such a system can be doubled to form articulated parallelograms.

These systems have the disadvantage that they transmit the forces very badly owing to the fact there is a large angle between each rod and the trajectory of the elements of the transporter. Furthermore, as in all systems of this kind, the forces increase from one element to the next in certain regions. The operation therefore becomes inefficient with more than a small number of elements for a small variation of speed, because high power is required to overcome the resistance due to friction.

Furthermore the expansions and contractions shorten the life of the deformable elements.

According to the present invention there is provided a system for the variable speed drive of movable elements guided along a trajectory comprising couplings connecting the elements in pairs, the couplings being formed of deformable polygonal loops having the same constant perimeter, the loops being mounted in tension between at least three linking points of which at least two are carried respectively by two successive movable elements and at least one follows a cam arranged substantially along the said trajectory and of which the profile is such that the said movable elements move towards and away from each other respectively in the regions of deceleration and acceleration, at least some linking points being formed by pivotable or slidable members so as to allow free deformation of the said polygonal loops.

This system alleviates the disadvantages of the previously proposed systems and allow elements to be connected in pairs so as to produce a variable speed drive without the necessity of providing very large forces, even for a relatively high number of elements.

Various configurations are possible for the deformable polygonal loops; triangular and quadrilateral shapes are the most simple and provide a useful embodiment.

In a particular embodiment, the deformable loops are substantially triangular and are each mounted in tension between two free-running pulleys, each pulley being fixed to a movable element, and a third pulley is carried at a distance by a tension carriage running on a rail. The rail has the form of a cam and causes, by the separation or approach of the carriage an approach or separation of two successive movable elements so as to decrease or increase their relative speed of movement. A control device having a constant speed acts on the said elements in at least one of their regions of constant separation where the speed is constant, for example in a zone of maximum speed.

The triangular deformable structures may either be arranged in the vertical or horizontal plane.

In an alternative arrangement, the drive system having a variable speed comprises two similar assemblies to that described above, each assembly being arranged parallel to each other and symmetrically with respect to the median longitudinal plane of displacement. When the triangular structures are vertical, the four free-running pulleys of a movable element can be carried in pairs on a same shaft on which the control device acts to ensure the movement of the movable elements.

The control device for the displacement of the movable elements in a region of constant speed may be formed by an assembly such as an endless rack, by chains, or by an endless belt driven by a motor and carrying a series of external stops. The external stops are separated by a distance equal to the distance between two successive elements in the region of constant speed. The device can also be formed by a linear induction motor, the induction elements being fixed to at least a certain number of movable elements.

A triangular shape obtained with three linking points, of which at least two are free-running pulleys or the like, arranged respectively on two consecutive movable elements and on a tension carriage guided along the cam is advantageous. A better efficiency can be obtained by having two loops arranged symmetrically for each coupling.

The loops can be placed either horizontally or vertically.

In still another embodiment of the invention, the deformable loops are substantially quadrilateral in shape and are each mounted in tension between four free-running pulleys or the like, a pair of the free-running pulleys sliding along a guide fixed to a movable element and the other pair sliding along another guide fixed to the following movable element. The said guides are arranged transversely with respect to the direction of travel of the said elements, a first pulley of each pair being constrained to follow a first cam and the second pulley of each pair being constrained to follow a second cam. The separation between the cams increases in the regions of deceleration and decreases in the regions of acceleration.

This embodiment is particularly interesting when arranged horizontally under the movable elements, the vertical extension of the transporter system thus being considerably reduced.

The linking points may advantageously be formed of free-running pulleys but any other member such as a slider, having a small resistance to the sliding of the deformable loop, can be used. Furthermore one linking point can also be formed by a fixing means, the deformation of the loop occurring at the other linking points.

The variable speed drive system has industrial applications, notably in the field of continuous transportation systems, of suspended containers and of side-rails for transportation systems having a variable speed.

More particularly in the case of a transporter of merchandise, the transporter is formed by a plurality of similar assemblies arranged vertically and parallel to each other, the pulleys of the said assemblies being carried by common shafts which form the movable elements.

In one embodiment for the transportation of people the transporter comprises a drive system in which the movable elements each carry a sliding plate.

When in the region of maximum speed, the distance between two successive movable elements can become very large, particularly in the case of suspended containers, in order to avoid having structures of enormous dimensions, it is possible to use between two principal movable elements formed by the rolling elements of the containers, at least one secondary movable element guided like the principal movable elements. The deformable loops of constant perimeter act between the two successive secondary elements or secondary and principal elements. In the case of suspended containers, the variable speed drive system is advantageously disposed above the guide device of the containers which, preferably, also serves as the guide device for the movable elements of the drive system.

The invention will now be described in more detail, by way of example only, with reference to the accompanying drawings, in which:

FIG. 1 is a diagrammatic elevational view of a drive system employing triangular loops;

FIG. 2 is a view on a larger scale of a part of the system shown in FIG. 1 corresponding to the passage from a region of variable speed to a region of maximum speed;

FIG. 6 is a diagrammatic view inside elevation of suspended containers driven by the drive system shown in FIGS. 1 and 2;

FIG. 7 shows diagrammatically an exploded view of a part of a transporter using a drive system with quadrilater loops;

FIG. 8 shows diagrammatically a view from above of a part of the drive system shown in FIG. 7 in an acceleration or deceleration region;

FIG. 9 shows diagrammatically an elevational view of the movable parts of a transporter, connected by the drive system shown in FIG. 8;

FIG. 10 is a diagrammatic view inside elevation of a side rail for a transporter for two people having a variable speed, driven by a variable speed drive system; and FIG. 11 is a plan view of the side rail shown in FIG. 10.

Figure 3:
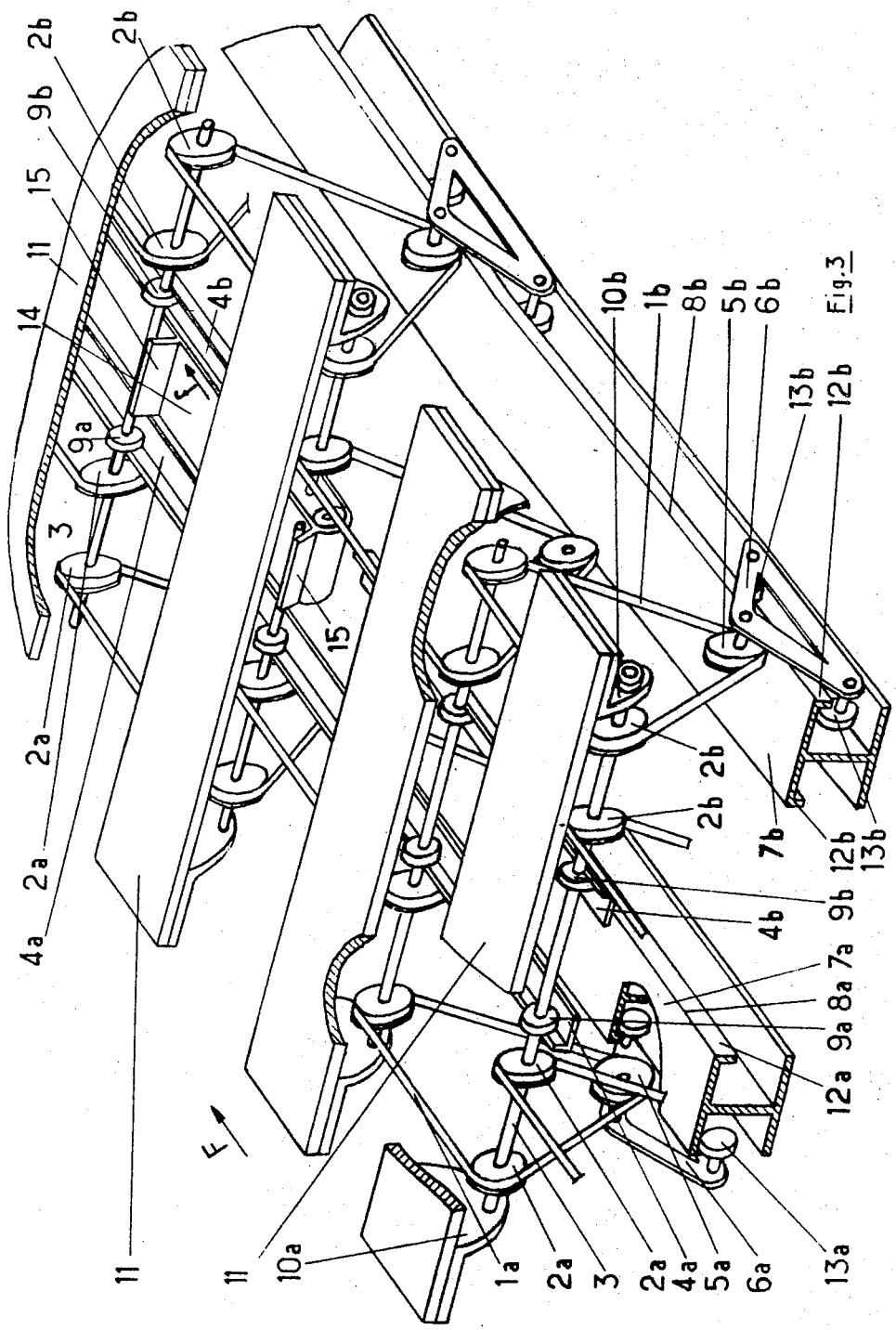
FIG. 3 is a perspective view of a part of a transporter having a variable speed and using the drive system shown in FIGS. 1 and 2.

In the drive system shown in FIGS. 1 and 2, the system comprises a series of movable parts, which are not shown in the drawing, interconnected by deformable couplings formed of links 1. The links 1 have the same length and are each mounted in tension between two free-running pulleys 2 carried by two horizontal shafts 3 guided on a guide rail 4. Each shaft 3 is fixed to a movable part. A third free-running pulley is carried at a distance from the parallel shafts 3 by a tension cariage 6 running on a rail 7. Each of the parallel shafts 3 supports another free-running pulley, in a way analogous to the pulleys 2, relative to the preceding or the following triangular structure. The rail 7 has an inclined ramp 8 which causes, by the carriage 6 approaching or moving away from the guide rail 4, the parallel shafts of the corresponding triangular structure to approach or move away from each other so as to reduce or increase the relative speed of the shafts. A control device linearly displaceable at a constant speed acts on the parallel shaft 3 in the region of maximum separation, that is the region of maximum speed $V_a$ so as to drive the assembly in the direction F. For this purpose, the distance between adjacent upper pulleys 2 increases relative to the separation of these pulleys in the region of minimum speed $V_b$ in passing through the region of variable speed $V_c$. The variable speed drive system described with reference to FIGS. 1 and 2 is industrially applicable, notably in the fields of continuous transporters, suspended containers and side rails for variable speed transporters.

In the case of the carrying of merchandise, a variable speed transporter may be formed by a plurality of similar vertical assemblies, of the type shown in FIGS. 1 and 2, the parallel shafts 3 being common to this plurality of assemblies and forming the mobile parts.

FIG. 3 shows a transporter having a variable speed capable of carrying people. It comprises a drive system having a variable speed with two similar parallel vertical assemblies similar to those described with reference to FIGS. 1 and 2. Identical parts are referenced by the same reference numerals although subscripts a and b are used to differentiate between the parts on respective opposite sides of the transporter.

Free-running pulleys $2a$ sharing a common shaft, guide runners $9a$ and $9b$ running on the guide rails $4a$ and $4b$, and free-running pulleys $2b$ similar to pulleys $2a$, are mounted on parallel shafts 3 and held by elastic fixing elements such as "circlips."

A cross-piece 11 is also mounted on each shaft 3 with the aid of bearings $10a$ and $10b$. The cross-piece 11 may carry a container or other carrying member generally known in the field of transporters, this member being either fixed or articulated to the corresponding cross-piece.

The link 1 passing over two free-running pulleys 2 passes over a third free-running pulley 5 carried at a distance from the pulleys 2 by a tension carriage 6 running on the rail 7. The rail 7 has an I-section with the upper wings having a lip 12 directed towards the lower wings. The tension carriage 6 is provided with wheels 13 which roll on the lower face of one of the upper wings of the rail 7 and are retained laterally by the web of the rail and the corresponding lip. With the following deformable triangular structure, the carriages 6 run respectively on one or other of the upper wings of the rail 7. This rail includes a ramp 8 in the region where the distance between the successive shafts 3 is varied, that is the region of variable speed.

The control of the transporter, in the region of maximum speed where the shafts 3 remain at their maximum separation distance, is provided by an endless belt 14 driven by a motor, not shown, and provided with a series of external stopblocks separated by this maximum distance. When the belt 14 moves in the direction of the arrow F, the stop-blocks drive the shafts 3 by contacting their central portions between the guide runners 9a and 9b.

Figure 4:
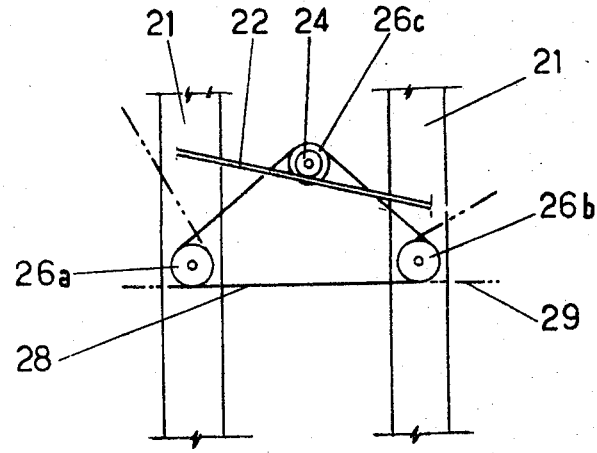
FIG. 4 shows diagrammatically a part of the triangular drive system arranged for horizontally.

The triangular structures forming the couplings, arranged vertically in the embodiment shown in FIG. 3 can also be disposed horizontally as shown in FIG. 4. In such case, two successive movable parts 21 are connected by a link 28 or 29 stretched between three free-running pulleys of which two, 26a and 26b, are mounted respectively on the mobile parts, the third 26c being guided along a cam 22 by a runner 24.

Figure 5:
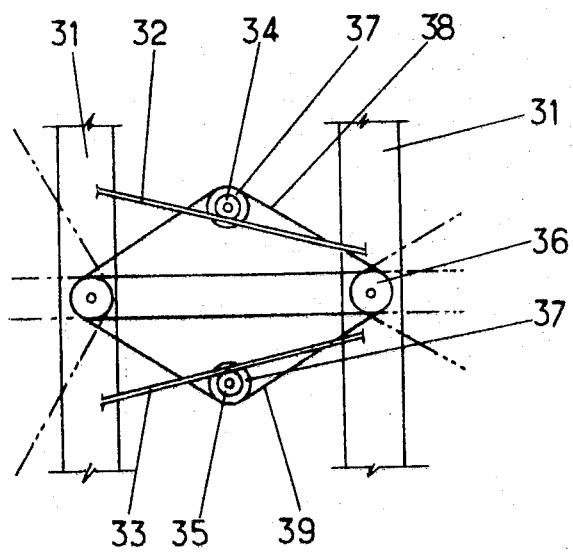
FIG. 5 shows diagrammatically a part of the drive system where each coupling is formed by two horizontal triangular loops.

In a further variation, shown in FIG. 5, the coupling is formed by two triangular loops 38 and 39, each movable element 31 being supported by two pairs of pulleys 36. Two other pulleys 37 follow two cams 32 and 33 using runners 34 and 35. The flexible links 38 and 39 are stretched respectively between two pulleys 36 and a pulley 37 and form two symmetrical substantially triangular loops.

FIG. 6 shows diagrammatically the application of a variable speed drive system similar to that shown in FIGS. 1 and 2, to the drive of suspended containers 16a, 16b having support-wheels 17a and 17b running on a rail 18a. The variable speed drive system is arranged above rail 18a. It could only have one deformable structure of which the two movable parts would include shafts 19a and 19b of the wheels 17a and 17b. In each region of variable speed, the distance between the shafts 19a and 19e, can be very large, several decameters in practice, one would obtain a triangular structure between two containers having a very large size perpendicular to the shafts 19a and 19b in each region of minimum speed. In order to overcome this disadvantage, as shown in FIG. 6, a number of triangular deformable structures of secondary movable parts 3c, 3d, and 3e are mounted like the principal movable parts 19a, 19b, between the rails 18a and 18b. Third free-running pulleys 5c, 5d, 5e, and 5f are carried by tension carriages 6c, 6d, 6e, 6f running on a rail 7c.

The shafts 19a and 19b carry, apart from wheels 17a and 17b of the containers, the pulleys 2c, 2d of the triangular structures and the guiding devices relative to the rails 18a and 18b.

A quadrilateral type variable speed drive system will now be described. It is shown diagrammatically in perspective view in FIG. 7. The movable elements of the system are cross-pieces 41 having wheels 42 which run on two rails 43. Guide means, not shown, ensure the correct positioning of each cross-piece 41 with respect to the rails 43. The drive system connects adjacent cross-pieces in pairs. It has two supports 44 which slide laterally along a shaft 45. Each support bears two free-running pulleys 46 and 47 mounted on a vertical shaft. Flexible links 48 and 49 having a constant length, which may be belts or chains, interconnect respectively the pulleys 46 or the pulleys 47 of two successive movable elements. Two runners 50 and 51 are each mounted on the vertical shaft of each support 44 and are each guided by one of two cams 52 and 53.

The drive system provides coupling between the mobile elements with spacings varying as a function of the profile of the cams, these spacings determining the variation of speed of each of the mobile elements. A group motor not shown, drives the assembly in a region of constant speed. Starting from this region, each mobile element drives the following owing to the described drive system.

Thus, the links 48 or 49 are permanently in tension, each support 44 sliding along its axis 45 so that each runner 50 or 51 is in contact with its respective cam 52 or 53. The profile of the cams 52 and 53 is such that the supports 44 sliding along their shaft 45, approach each other or move away from each other. This causes the movable elements concerned to do the opposite because of the constant perimeter length of each link.

This movement is shown more clearly in FIG. 8 where the cams 52 and 53, the runners 50 and 51 of each movable element, the pulleys 46 and 47 of each support 44 (not shown), and the links 48 and 49 interconnecting them are shown.

For convenience, the links 48 (interconnecting the pulleys 46), are showed in full lines whereas the links 49 (interconnecting the pulleys 47) are shown in broken lines.

In the left part of FIG. 8, the cams 52 and 53 are separated from each other, each link 48 or 49 in that position being in the form of a thin rectangle with respect to the longitudinal direction of the transporter. It follows that the corresponding cross-pieces are closely spaced with respect to each other. On the contrary, in the right part of FIG. 8, the cams 52 and 53 are more closely spaced. The links then form elongated rectangles in the longitudinal direction of the transporter and the cross-pieces are thus separated from each other by a greater distance.

In the central convergent or divergent part of FIG. 8, according to the direction of movement, the substantially trapezoidal profile of the links varies progressively between the two extreme triangular shapes. This therefore causes a progressive variation of the distance between successive cross-pieces.

It therefore possible to obtain a predetermined variation of speed. In fact, owing to the continuity of the movable elements imposed by the constant speed in the adjacent regions, which produces a constant frequency of passage of movable elements at any point in the transporter, this variations determines that of the separation between successive movable elements. In this way, knowing the law of movement desired, a geometrical analysis of the trapezium formed by each link gives the separation between the two cams. The profile of the latter is of course known.

It can be seen therefore that the described drive system allows a movable element to pass from a region of low constant speed $V_b$ to a region of high constant speed $V_a$, or vice versa, across a region $V_c$ where the speed varies at a predetermined rate. The choice of this rate allows, in particular, parameters to be used which lead to added comfort, these being generally the maximum values of acceleration and its first derivative.

The spacing between the cross-pieces 41 being variable, it is necessary to join to them plates or the like, which form an upper continuous surface of the transporter on which passengers, if the transporter is for pedestrians, can stand or move about, these plates can be of any known type but are preferably grooved so as to provide a combing between the plates and also the landing plates at the edge of the transporter.

FIG. 9, which must be considered with FIG. 8, shows diagrammatically the position of movable element associated with the drive system of FIG. 8. FIG. 9 shows the cross-pieces 41, their wheels 42, the rails 43, and the plates 54 which are each fixed at one of their ends to a crosspiece 41 while the other end moves by sliding or rolling on a neighbouring plate 54. In the region $V_a$ of maximum spacing between the movable elements (that is to say in the region of maximum speed), the plates are nearly end-to-end. In the region $V_c$ of variable speed, the plates overlap more and more until the region of maximum overlapping in the region $V_b$ of minimum speed.

It is important to notice that the angle of inclination of the cams 52 and 53 as shown in FIG. 8, has been exaggerated so as to facilitate the understanding of the invention. In practice, the acceptable, acceleration leads to a much smaller angle of inclination. Furthermore, the profile shown as substantially rectilinear will be generally curved. This curve can be calculated, as has already been said, either by using a parametric equation or point by point. As for the drive system of the triangular and the quadrilateral type drive system above described with reference to a continuous tranporter can equally apply to numerous other applications by making a few minor alterations to details. It can be used for example for moving personal carriers.

If the distance between two movable elements is large, which is the case when the movable elements are personal carriers with a capacity of six to eight persons for example the width becomes excessive. It is then possible to separate two successive movable elements by intermediate elements. Thus for example, one crosspiece in ten carries a personal carrier, whereas the remaining nine only serve as relays for the links which have thus a more suitable length.

The variable speed drive system is also advantageous when applicable to side-rails for variable speed people carriers. In this case, the side rail shown in FIGS. 10 and 11 carries a plurality of similar triangular assemblies, of the kind shown in FIGS. 1 and 2, and arranged vertically. Several parallel links 1g pass over the two free-running pulleys 2g carried by two parallel shafts 3g and over free-running pulleys 5g supported by a tension carriage 6g running on a rail 7g. The shafts 3g are guided in any known way on a rail 4g. On the shafts 3g are fixed bridges 20 which span the belts 1g and the free-running pulleys 2g. A vertical partition 30, for example of corrugated iron, protects the passengers.

The bridges 20, which act as movable elements, have a transverse dimension such that the passengers can grip them with the hand. This is normally driven by these movable elements at a speed which is preferably synchronised with that of the variable speed transporter, this being particularly easy in the case of a transporter such as that shown in FIGS. 3 and 7. If the hand of the user leaves the bridge 20 which he was holding or cannot reach such a bridge at the beginning, the hand comes to rest on the cover of the belts 1g. This is not dangerous because the cover is not moving relative to the transporter. Furthermore, a linking point can be fixed, that is to say a free-running pulley may be replaced by fixing means. Thus the belt cover constitute a perfectly reliable support.

In an embodiment similar to that shown in FIGS. 10 and 11, each element of the side-rail only has one triangular link. In the same way, the bridges overlap the points of attachment of two consecutive triangular assemblies. Preferably, the links are formed so as to provide a stable support for the hand of a passenger.

It should be noted that, in the various embodiment described above, it is not necessary for the various members to be accurately made, the belts undergo neither an expansion nor contraction prejudicial to their durability. Furthermore there always exists at least one portion of each flexible link for which the inclination with respect to the direction of movement is zero or at least a very small angle 11, so that the forces are easily transmitted from one coupling to the following coupling. Such a system therefore requires lower power than the previously proposed systems.

The linear drive at constant speed can be realised with the aid of an endless assembly, for example a rack, chains, or a linear induction motor, the induction elements being fixed to the movable elements.

The pulleys supporting the loops upstream and downstream of a cross-piece may not be coaxial as has been shown in the described embodiment. This arrangement requires the least space but it may also be useful to arrange these pulleys in the same plane so that the tension between two consecutive loops does not produce a torque on the element which supports these pulleys.

What I claim is:

1. A system for the variable speed drive of movable elements guided along a trajectory comprising couplings connecting the elements in pairs, deformable polygonal loops forming said couplings having the same constant perimeter, the said loops being mounted in tension between at least three linking points of which at least two are carried respectively by two successive movable elements and at least one follows a cam arranged substantially along said trajectory said cam having a profile such that said movable elements move towards and away from each other respectively in the regions of deceleration and acceleration, at least some of said linking points being pivotable or slidable members for free deformation of the said polygonal loops.

2. A drive system as claimed in claim 1 wherein the said polygonal loops are substantially triangular.

3. A drive system as claimed in claim 2 wherein the said deformable loops are mounted in tension between two linking points formed by free-running pulleys, and each of said pulleys being fixed to one of said movable elements, and at least a third linking point formed by another free-running pulley, a tension carriage running on a rail carrying said other pulley, said rail being a cam causing separation or approach of the carriage and approach or separation of two successive movable elements.

4. A drive system as claimed in claim 3 wherein the said deformable loops are arranged vertically or horizontally.

5. A drive system as claimed in claim 3 comprising two similar assemblies arranged symmetrically with respect to a longitudinal median plane and parallel to each other.

6. A drive system as claimed in claim 5 wherein the couplings are vertical and four free-running pulleys of a movable element are mounted in pairs on a shaft and a control device for linear displacement at a constant speed of the movable elements acting on said shaft.

7. A drive system as claimed in claim 1 including means for providing linear displacement of said movable elements in a region of constant speed having an endless chain or belt driven by a motor and a series of external stop-blocks mounted on said chain or belt mutually separated by the distance between two movable elements in the region of constant speed.

8. A drive system as claimed in claim 1 including a control device for the linear displacement of said movable elements in a region of constant speed having a linear induction motor and induction elements for said motor fixed to said movable elements.

9. A drive system as claimed in claim 1 wherein the polygonal loops are substantially quadrilateral.

10. A drive system as claimed in claim 9 wherein the deformable loops are mounted in tension between four linking points formed by four free-running pulleys, a pair of the free-running pulleys sliding along a guide fixed to a movable element and the other pair sliding along a guide fixed to the following movable element, the said guides being arranged transversely with respect to the direction of displacement to the said elements, a first pulley of each pair being constrained to follow a first cam and the second pulley of each pair a second cam, the separation between the cams increasing in the regions of deceleration and decreasing in the regions of acceleration.

11. A drive system as claimed in claim 10 wherein the said deformable loops are arranged horizontally.

12. A drive system as claimed in claim 1 at least one of said movable elements supporting cross-pieces and means on said cross-pieces for carrying passengers or goods.

13. A drive system as claimed in claim 1 said movable elements include side rails for transporters having a variable speed.

14. A transporter for goods including a drive system having variable speed as claimed in claim 1 comprising a plurality of similar assemblies arranged vertically and parallel to each other, said free-running pulleys of this plurality of assemblies being mounted, for each movable element, on the same transverse shaft.

15. A personal transporter having a variable speed including a drive system as claimed in claim 1, each movable element including a sliding plate.

16. A transporter with containers including a variable speed drive system as claimed in claim 1, including secondary movable elements, at least one secondary movable element being positioned between two principal movable elements formed by the support elements for said containers, the deformable loops of constant perimeter acting between two successive secondary elements or a secondary element and a principal element.

17. A transporter for suspended containers as claimed in claim 16 wherein the variable speed drive system is arranged above the guiding device of the containers and the guiding device for the movable elements of the drive system.

18. A side rail including a variable speed drive system as claimed in claim 1 comprising a vertically arranged assembly, the movable elements providing support for the user.

19. A side rail including a variable speed drive system as claimed in claim 1 comprising a plurality of similar assemblies arranged vertically and parallel to each other, the free-running pulleys of said plurality of assemblies being mounted, for each movable element, on at least one common shaft, and bridges overlapping said movable elements and fixed on said shafts.

* * * * *